Sept. 29, 1953
C. HOOIJKAMP ET AL
2,654,002
CIRCUIT-ARRANGEMENT IN A TELEPHONE SYSTEM FOR THE RECEPTION OF SIGNALS
Filed March 3, 1951
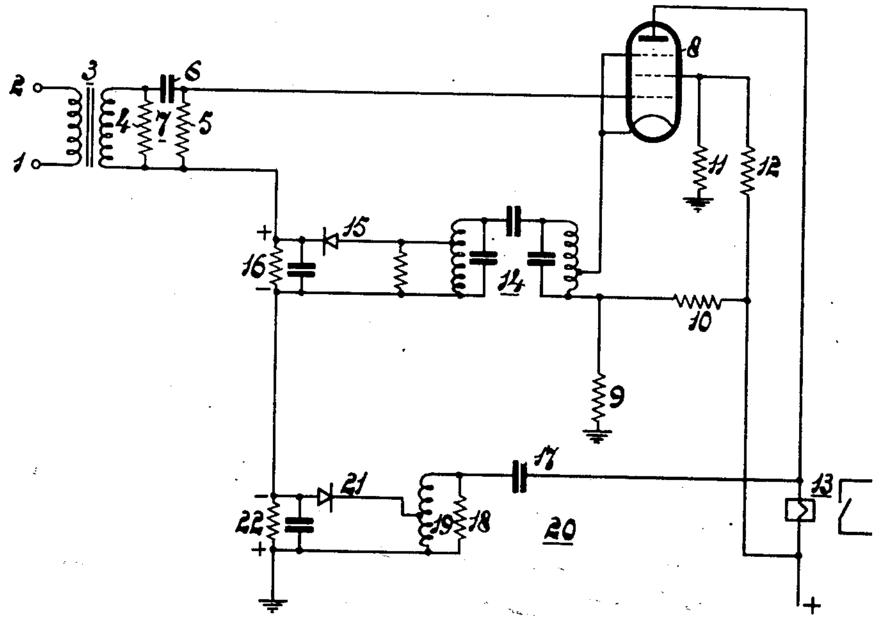
Inventors
RUDOLF HAUS
CORNELIS HOOIJKAMP
By Fred M Vogel
Agent Patented Sept. 29, 1953

2,654,002

UNITED STATES PATENT OFFICE 2,654,002

CIRCUIT-ARRANGEMENT IN A TELEPHONE SYSTEM FOR THE RECEPTION OF SIGNALS

Cornelis Hooijkamp, Hilversum, Netherlands, and Rudolf Haus, Zurich, Switzerland, assignors to Hartford National Bank and Trust Company, Hartford, Conn., as trustee Application March 3, 1951, Serial No. 213,784
In the Netherlands March 17, 1950

4 Claims. (Cl. 179—84)

This invention relates to a circuit-arrangement used for the reception of signals in a telephone system, the frequency of said signal lying in the speech frequency range, incoming oscillations to said circuit arrangement being supplied to the control-grid of a discharge tube, then said tube being connected to a network which passes a frequency band that is narrow with respect to the speech frequency band and that contains the signal frequency, the output voltage of this network being rectified and the rectifier voltage produced acting upon the value of the direct current which flows through the energizing winding of a relay included in an output circuit of the tube.

A serious limitation of such known circuit arrangements is that such circuits will respond to oscillations of signal frequency as well as to signals, with consequent undesirable relay operation.

It has been suggested that such undesirable operation may be eliminated by suitably selecting the time constant of the rectifying circuit, but this involves a comparatively critical proportioning of the circuit-arrangement. Moreover, such a solution is not always satisfactory.

The object of this invention is to prevent undesirable relay operation in a more satisfactory fashion. This is accomplished by adding a second network, which passes a wider frequency band than the first mentioned network, said band containing the signal frequency, to the output circuit of the discharge tube, rectifying the output voltage of the second network in such polarity as to oppose the effect of the rectified output voltage of the first network on the direct current flowing in the relay coils. The first network is so constructed that a negative feedback voltage is supplied from it to the cathode circuit of the discharge tube, said negative feedback voltage being a maximum for frequencies within the frequency range of the first network.

When an incoming call is supplied to this new circuit arrangement, those oscillations which have a frequency different from the signal frequency will enable the second network to produce a voltage, which after rectification, will act to prevent undesirable relay operation. Even random speech oscillations of signal frequency will have no effect.

Should the incoming call only contain the signal frequency, the negative feedback developed across the cathode circuit of the discharge tube will be of such value that the rectified output voltage of the second network will be low with respect to the rectified output voltage of the first network, so that the relay will operate properly.

In order that the invention may be more clearly understood and readily carried into effect, it will now be described more fully with reference to the accompanying drawing, given by way of example.

The incoming oscillations are supplied to input terminals 1, 2 of a transformer 3 which, together with resistances 4, 5 and a capacitor 6, constitutes a high-pass filter 7. As will be set out hereinafter, the cut-off frequency of this filter is, for example, 1000 c./s.

The output voltage of this filter is supplied to the control-grid of a discharge tube 8.

By means of resistors 9, 10, 11 and 12 the anode current of this tube is adjusted to a value of, say, 2 m. amps.

The anode-circuit comprises the energizing circuit of a relay 13 which is energized at a current strength of, say, 4 m. amps. and becomes de-energized at 2.5 m. amps. so that the relay contacts are normally de-energized.

Apart from the resistance 9, the cathode lead of tube 8 includes the input impedance of a band-pass filter 14.

This band-pass filter has a narrow transmission band which for example extends from 2960 to 3040 c./s. symmetrically at both sides of the signal frequency of 3000 c./s.

The output voltage of this band-pass filter is rectified with the use of a rectifier 15 and the direct voltage set up across the resistance 16 and the capacitor connected in parallel herewith is supplied across the control-grid of the tube 8 wtih the polarity indicated in the drawing.

The resistance and the inductance of the energizing winding of the relay 13, together with the capacitor 17, the resistance 18 and the inductance 19, constitute a high-pass filter 20, the cut-off frequency of which is approximately equal to that of the high-pass filter 7, for example 1000 c./s.

At the output of this filter provision is also made by a rectifying circuit comprising a rectifier 21, a resistance 22 and a parallel connected capacitor.

As appears from the drawing the sense of the rectifier 21 is opposite to that of rectifier 15, so that the direct voltage across the resistance 22, which is also operative across the control-grid of tube 8, acts upon the direct current across this tube in a manner opposite to that in which this is effected by means of the direct voltage across the resistance 16.

If an oscillation of the signal frequency, for example 3000 c./s., supplied to the input terminals, this oscillation is passed by the high-pass filter 7 and amplified by the tube 8.

Across the output of the filter 14 a voltage of signal frequency is produced which, after having been rectified, produces a voltage of such polarity across the resistance 16 that the anode current of the tube 8 is increased.

The filter 14 is furthermore constructed in such manner that in regard to frequencies within the transmission range, i. e. from 2940 to 3060 c./s., the input impedance of this filter is materially higher than in regard to frequencies outside this range, so that for oscillations of signal frequency or of a slightly different frequency a much stronger negative feedback is produced than in regard to other frequencies.

Consequently, on the reception of oscillations of signal frequencies substantially no voltage will occur across the input of the filter 20, so that no negative voltage is produced across the resistance 22.

Consequently, the anode current of the tube 8 is substantially only determined by the voltage across the resistance 16, which voltage attains such a value on the reception of signals that the anode current rises to more than 4 m. amps., with the result that the relay 13 is energized.

When a call is made, the oscillations of frequencies outside the band pass of the band-pass filter 14 produce a direct voltage across the resistance 22, so that the anode current of the tube 8 is reduced and the relay 13 is not energized.

Transient oscillations of a frequency between 2940 and 3060 c./s. will produce a positive direct voltage across the resistance 16, but simultaneous oscillations of different frequency produce a negative direct voltage across the resistance 22. The circuit-arrangement should be proportioned so that the negative direct voltage exceeds the positive direct voltage.

As stated above, the two filters 7 and 20 are high-pass filters with a cutoff frequency of, say, 1000 c./s. These filters are only required if the signal voltages are pulsatory.

If, for example, a signal voltage of 3000 c./s. is supplied for 50 m. sec., followed by a time interval of 50 m. sec., as is customary, the rectified signal finally occurring across the control-grid of the tube 8 contains, in the absence of the filter 7, a fundamental frequency of 10 c./s. and the odd numbered harmonics 30, 50, 70 c./s. and so on. These alternating voltages produce alternating voltages across the energizing winding of the relay 13, which voltages, in the absence of the filter 20, produce a negative direct voltage and thus prevent the relay 13 from being energized.

In order to avoid this, the voltages of these frequencies are rejected by the filter 20.

However, if only the filter 20 is available, no negative direct voltage occurs any longer at frequencies below 1000 c./s. Since the anode current of the tube is only about 2 m. amps., when the relay is de-energized, the tube will act as an anode detector at frequencies below 1000 c./s. This means that the average anode current will increase when signals are supplied to the control-grid, so that the relay 13 tends to become energized. In order to avoid this, the filter 7 also is a high-pass filter with a cut-off frequency of 1000 c./s.

For the sake of completeness it is pointed out that, although in the circuit-arrangement described the relay 13 is energized when the anode current of the tube 8, increases, is that the relay may be so connected that it will be energized when the anode current of the tube decreases.

What we claim is:

1. Telephone apparatus for the interception of signals lying within the frequency range of a speech frequency band contained in incoming oscillations, said apparatus comprising a discharge tube including a cathode, a grid and an anode and circuits therefor, means to supply said incoming oscillations to the grid circuit of said tube, a first band-pass network having an input impedance and having a frequency band-pass which includes the signal frequency and which is narrow with respect to said speech frequency band, said input impedance being included in the cathode circuit of said tube to develop a negative feedback voltage thereacross which is maximum with regard to the frequencies within the band-pass of said first network, a second band-pass network having a frequency band-pass which also includes the signal frequency and whose band-pass is wider than that of said first network, a relay provided with an energizing coil included in the anode circuit of said tube, means to supply a positive potential through said coil to said anode, means to rectify the output of the first network to produce a first direct voltage, means to supply said first voltage to the grid circuit of said tube thereby to govern current flow in said coil, means coupling the input circuit of said second network to the anode circuit of said tube, means to rectify the output of said second network to produce a second direct voltage, means to apply the second direct voltage to said grid circuit in opposing polarity relative to said first direct voltage whereby when a signal is present in said incoming oscillations said relay is energized and in the absence of said signal said relay remains de-energized.

2. Apparatus, as set forth in claim 1, wherein the said second network includes an input impedance which is constituted by the energizing coil of said relay.

3. Apparatus, as set forth in claim 1, further including a third network and means to apply said incoming oscillations to said grid circuit through said third network, said second and third networks being constituted by high-pass filters.

4. Telephone apparatus for the interception of signals lying within the frequency range of a speech frequency band contained in incoming oscillations, said apparatus comprising a discharge tube including a cathode, a grid and an anode, and circuits therefor, a first band-pass network having an input impedance and having a frequency band-pass which includes the signal frequency and which is narrow with respect to said speech frequency band, said input impedance being included in the cathode circuit of said tube to develop a negative feed-back voltage thereacross which is maximum with regard to the frequencies within the band pass of said first network, a second band-pass network constituting a high-pass filter having a frequency band-pass which also includes the signal frequency and whose band-pass is wider than that of said first network, said second network including an impedance which is constituted by the energizing coil of a relay, said energizing coil being included in the anode circuit of said tube, a third band-pass network constituting a high-pass filter, means to apply said incoming oscillations to the grid circuit of said tube through said third network, means to supply a positive potential through said coil to said anode, means to rectify the output of the first network to produce a first direct voltage, means to supply said first voltage to the grid circuit of said tube thereby to govern current flow in said coil, means coupling the input circuit of said second network to the anode circuit of said tube, means to rectify the output of said second network to produce a second direct voltage, means to apply the second direct voltage to said grid circuit in opposing polarity relative to said first direct voltage whereby when a signal is present in said incoming oscillations said relay is energized and in the absence of said signal said relay remains de-energized.

CORNELIS HOOIJKAMP.
RUDOLF HAUS.

References Cited in the file of this patent

UNITED STATES PATENTS

| Number | Name | Date |
|---|---|---|
| 1,711,651 | Pruden | May 7, 1929 |
| 1,958,166 | Laurent | May 8, 1934 |
| 2,145,053 | Meszar | Jan. 24, 1939 |
| 2,282,131 | Hadfield | May 5, 1942 |
| 2,290,570 | Paddle | July 21, 1942 |
| 2,293,869 | Vaughan | Aug. 25, 1942 |